B. S. HARRISON.
METHOD OF AND APPARATUS FOR DRYING MATERIALS.
APPLICATION FILED DEC. 4, 1918.
1,408,457.
Patented Mar. 7, 1922.
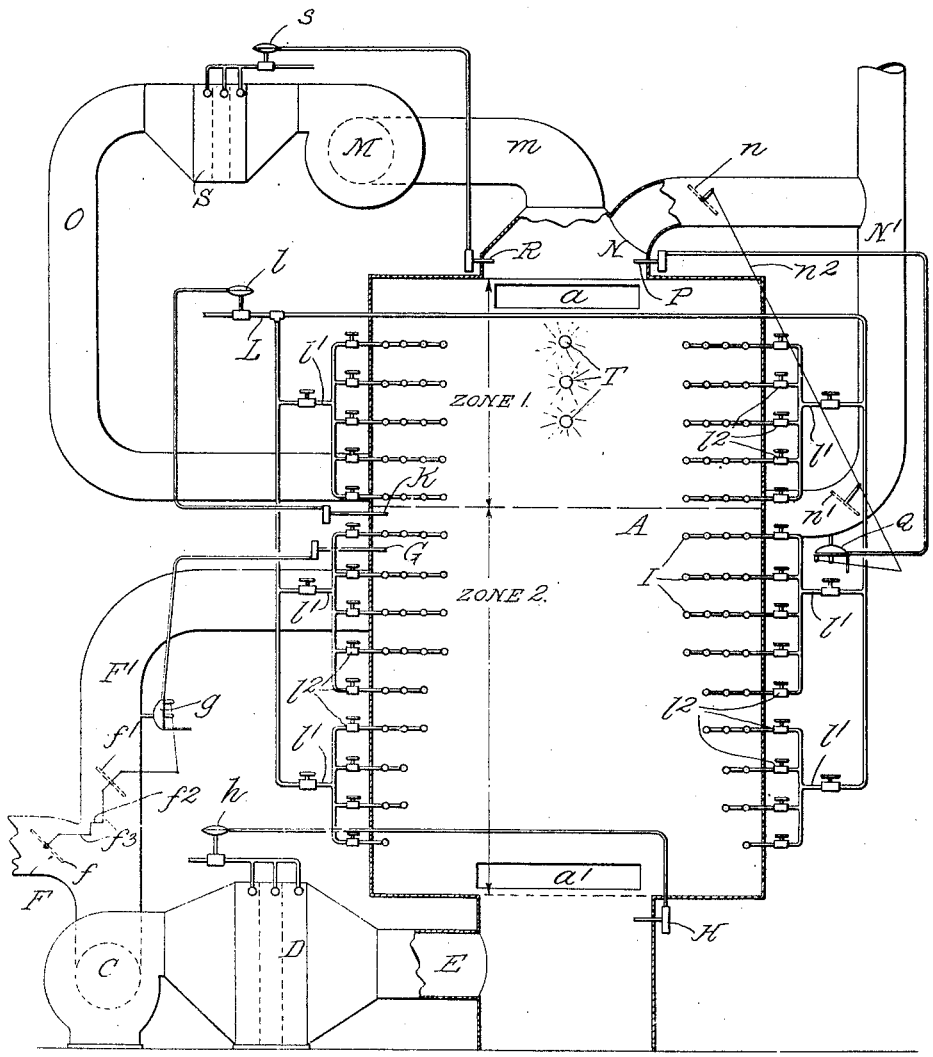
INVENTOR.
Burt S. Harrison
By Wilhelm & Parker.
ATTORNEYS.

UNITED STATES PATENT OFFICE.

BURT S. HARRISON, OF BROOKLYN, NEW YORK, ASSIGNOR TO CARRIER ENGINEERING CORPORATION, OF NEW YORK, N. Y.

METHOD OF AND APPARATUS FOR DRYING MATERIALS.

1,408,457. Specification of Letters Patent. Patented Mar. 7, 1922.

Application filed December 4, 1918. Serial No. 265,265.

*To all whom it may concern:*

Be it known that I, BURT S. HARRISON, a citizen of the United States, residing at 32 Garden Place, Brooklyn, in the county of Kings and State of New York, have invented a new and useful Improvement in Methods of and Apparatus for Drying Materials, of which the following is a specification.

This invention relates more particularly to a method of and apparatus for drying materials, such as peeled or sliced vegetables and fruits.

When certain vegetables and fruits, such as potatoes for instance, are peeled or sliced, the surfaces thus exposed rapidly become darkly discolored due to oxidation in the presence of enzymes. In processes heretofore practiced for drying such fruits and vegetables, it has been customary to blanch or parboil the sliced or peeled vegetables or fruits before putting them into the drier, in order to avoid this oxidation with its consequent discoloration. Blanching, however, has objectionable features. In the case of potatoes, for example, it hydrolizes the starch and gelatinizes the cells so that the dried slices have a more or less translucent appearance and have to be soaked for a long period of time before they will regain the water necessary to make them fit for use. If dried too hard, even four to six hours soaking will not restore them to anything like the condition of pliability of the raw sliced potatoes.

The object of the invention is to produce a commercially practical and efficient method and apparatus whereby such materials can be expeditiously dried without the necessity of parboiling, blanching or other preparatory treatment, and whereby oxidation and discoloration of the material are prevented and the dried material will regain water and be restored more nearly to its original condition by soaking in cold water for a much shorter time than is required for fruits and vegetables dried by prior methods.

In drying sliced or peeled potatoes, for example, by this method, the potatoes, without parboiling, blanching or other preparatory treatment, are put directly into a drier in which they are first subjected to air having a high temperature and a high relative humidity, and then the drying is continued by air of gradually decreasing temperature and humidity. The potatoes are first subjected to a current of pure air having a temperature of from about 200° F. to about 250° F. and a relative humidity of from about 20 per cent to about 30 per cent. After treatment for a short time, preferably about thirty minutes under these conditions, the temperature and humidity are gradually lowered until at the end of about one hour, more or less, the temperature is about 160° F. and the relative humidity from about 16 per cent to about 18 per cent. During the subsequent drying, preferably for a period of about two hours, more or less, the temperature drops to about 140° F. and the relative humidity decreases to from about 8 per cent to about 12 per cent, the drying being finished under these conditions in about three hours. The method is further explained in connection with the apparatus about to be described, for practicing the method.

The accompanying drawing is a diagrammatic sectional view of an apparatus embodying the invention and adapted for carrying out the method claimed.

A represents a chamber or casing in which the sliced or peeled potatoes or other material are dried. The material preferably enters the casing through a suitable opening $a$ in its upper portion and moves gradually downward through the casing, leaving the same through an opening $a^1$ at the lower portion of the casing. This invention is not dependent upon the particular construction of the drier or the means for causing the gradual travel of the material through the same and any suitable construction, such for instance as disclosed in Patent No. 1,191,075, granted to me July 11, 1916, can be employed. In said patented drier the material is placed on trays which are introduced into the upper portion of the drier casing and travel slowly downwardly through the same on a spiral track or way. A similar drier is preferably used for practicing the present method.

The drying space in the drier casing is divided as hereinafter explained, into distinct upper and lower drying zones 1 and 2, in which different conditions of temperature and humidity are maintained. The upper zone 1 preferably occupies a relatively small portion of the drying space and the lower zone the remainder or such greater portion of the drying space.

C represents a fan for delivering air to the lower end of the drier casing and D represents steam coils, or a heater of other suitable sort, located in the air trunk E for heating the air before it enters the drier. The fan intake or suction pipe has a fresh air supply branch F and a return air branch F' which connects with the drier casing between the upper and lower ends thereof, preferably near the upper end of the lower drying zone 2, and these branches are controlled by dampers $f$ $f^1$ respectively adapted to be set so as to enable the use either of fresh air, return air from the drier, or a suitably proportioned mixture of the fresh and return air. The dampers are suitably connected, as by a lever $f^2$ and links $f^3$ to cause one damper to open as the other closes, and the position of the dampers is controlled by a hygrostat G in the drier casing and a suitable diphragm or motor $g$ which is operatively connected to the dampers. The temperature of the air entering the drier casing from the trunk E is maintained substantially constant by a thermostat H which is located in the lower portion of the casing, or where it is affected by the temperature of the entering air, and regulates the supply of steam to the air heating coils D by means of a diaphragm valve $h$ in the steam supply pipe for the heating coils.

Within the drier casing and preferably extending from bottom to top thereof are arranged direct radiation steam coils I. The supply of steam to these coils is regulated by a thermostat K arranged preferably in the heater casing about at the upper end of the lower drying zone 2, and a diaphragm valve $l$ in the steam supply line for the coils I. Preferably, these coils are arranged in several groups, each group connected by a pipe $l^a$ to the main steam supply line L. Each coil I is provided with a regulating valve $l^2$ and each pipe $l^a$ with a regulating valve $l'$. The thermostat K, valves $l^2$ and $l^1$ can be adjusted so as to maintain a uniform temperature throughout the lower zone 2 of the casing or so as to give a gradually increasing temperature from the bottom to the top of the lower zone.

This may be explained as follows:—

The natural tendency of the heated air entering the lower part of the chamber A is to rise therein, and together with the heat from the steam coils I, will produce a higher temperature at the top of the chamber than at the bottom. The evaporation of moisture from the moisture laden material entering the top of the chamber causes a reduction in the temperature in the top of the chamber. As the material moves downwardly this effect is gradually lessened, due to the continued lower rate of evaporation, and the material reaches the lower part of the chamber in a dried condition and consequently does not affect the temperature of the entering, heated air. If, therefore, the valves $l^1$, $l^2$ be intially set to regulate the coils I so that they will give just the right quantity of heat to restore the heat taken up by the evaporation of the moisture in the material in the upper zones of the chamber, the thermostat K may be adjusted to control the steam supply to the coils I as required, for any predetermined, uniform temperature throughout the chamber.

On the other hand, a gradually increasing temperature from the bottom to the top of the drier casing may be readily provided by adjusting the valves $l^1$ $l^2$ of the steam coils so that they will, from the bottom to the top, successively give off an increasing amount of heat in excess of the amount absorbed by evaporation. The thermostat K will, as before, maintain the conditions required through its regulation of the steam supply valve under the control of the temperature required in the top of the chamber and for which it may be set. By arranging the steam coils, as shown, in different groups, each controlled by a separate valve, and providing each coil of the several groups with a separate controlling valve $l^2$ a very accurate control of the temperature throughout the drier is made possible.

M represents a recirculating fan which is connected by a suction pipe $m$ with a vent pipe N leading from the upper end of the drier casing. This vent pipe connects with a second vent pipe $N^1$ leading from the casing at an elevation about at the top of the lower or second drying zone. The discharge pipe O of the fan M connects with the drier casing at about the elevation of the bottom of the first or upper drying zone, or just about the level of the connection of the vent pipe $N^1$ with the casing. The vent pipes N and $N^1$ are provided with dampers $n$ $n^1$ respectively, which are preferably suitably connected as by link $n^2$, so as to cause one damper to open as the other closes. The recirculating fan is adapted to draw the moisture-ladened air from the top of the upper drying zone and more or less of the air from the lower or second zone through the vent pipes N $N^1$ and return the air to the upper drying zone through the pipe O, thereby maintaining a desired higher relative humidity in the upper drying zone than in the lower zone. The amount of air taken from the lower or second zone depends upon the position of the dampers $n$ $n^1$. The relative humidity in the upper drying zone is controlled by a hygrostat P which is located in the upper end of the drier casing, or where it will be affected by the humidity in the upper end of the casing, and controls the position of the dampers n n¹ in the vent pipes. For this purpose the hygrostat is operatively connected to a diaphragm or motor Q for operating the dampers n n¹.

A thermostat R located in the upper end of the upper drying zone, or where it will be affected by the temperature at this point, controls the temperature in the upper drying zone by regulating the steam supply to a steam heating coil S, or other suitable heater, located in the discharge pipe O of the recirculating fan. The thermostat is operatively connected to a diaphragm valve s in the steam supply pipe for this coil, or other suitable heat regulating device.

The thermostats H, K and R and the hygrostats G and P and the means through which they operate to regulate the temperature of the entering air and the temperature and relative humidity in the two zones of the drier can be of any usual or suitable construction adapted to produce the required conditions. Since the invention is not dependent upon any particular construction of these parts, they are shown diagrammatically only.

T represents steam spray nozzles arranged to discharge steam, preferably under hand control, into the upper drying zone in order to obtain the necessary relative humidity conditions when starting the drier. When the drier is full of drying material, the steam from the nozzles T is not necessary and is cut off. Thereafter the relative humidity conditions are regulated under the control of the hygrostats G and P, by recirculating the air from the drier, as above explained.

In the operation of the drier the potatoes or material travel slowly downwardly through the casing, passing first through the upper zone 1 and then through the lower zone 2. In the upper zone a temperature between about 200° F. and about 250° F. and a relative humidity of from about 20 per cent to about 30 per cent are maintained by the air recirculating and heating means under the control of the hygrostat P and the thermostat R, while in the lower zone the temperature gradually decreases until it is about 140° F. at the bottom of the zone and the relative humidity gradually decreases until it is about 8 per cent to about 12 per cent, these conditions being maintained by the air recirculating and heating means under the control of the hygrostat G and the thermostats H and K. The enzymes are rendered inactive by the high temperature and the humidity conditions maintained in the upper zone of the drier, and by regulating the temperature and humidity of the air in the drier, as explained, the material is dried uniformly throughout without oxidation or discoloration, in a relatively short time, usually about three hours. Potatoes thus dried have a white, opaque appearance instead of being translucent or gelatinized and they will regain water and be softened and restored to a condition practically like fresh, raw potatoes and be capable of similar uses by soaking them for only about twenty to thirty minutes in cold water. They lose nothing by the drying process except water and the ferment. If the potatoes were subjected to the high temperature stated without the described regulation of the humidity the enzymes would be destroyed and this would discolor the potatoes and they would not regain water as required to restore them to anything like their natural condition.

I claim as my invention:

1. The hereindescribed method of drying material, such as sliced fruits and vegetables, which is subject to oxidation from exposure, consisting in subjecting the material progressively first to air having a temperature between about 200° F. and about 250° F. and a humidity between about 20 per cent and about 30 per cent, and then to air having a temperature of about 160° F. or less and a relative humidity of about 18 per cent or less.

2. The hereindescribed method of drying material, such as sliced fruits and vegetables, which is subject to oxidation from exposure, consisting in subjecting the material progressively first to air having a temperature between about 200° F. and about 250° F. and a humidity between about 20 per cent and about 30 per cent, and subsequently to air having a temperature gradually lowering from a point at or below said above mentioned temperature and a relative humidity gradually lowering from a point at or below said above mentioned percentage of relative humidity.

3. The hereindescribed method of drying material, such as sliced fruits and vegetables, which is subject to oxidation from exposure, consisting in passing the material through a current of heated air, and regulating the temperature and humidity of the air so that the material is first subjected to air having a temperature between about 200° F. and about 250° F. and a humidity between about 20 per cent and about 30 per cent, and subsequently to air having a temperature gradually lowering from about 160° F. and a relative humidity gradually lowering from about 18 per cent.

4. The hereindescribed method of drying material, such as sliced fruits and vegetables, which is subject to oxidation from exposure, consisting in passing the material through a drying chamber, and separately regulating the temperature and humidity in different portions of the drying chamber so as to form two different drying zones through which the material passes in succession, the first zone having a temperature between about 200° F. and about 250° F. and a humidity between about 20 per cent and about 30 per cent and the second zone having a temperature gradually lowering from about 160° F. and a relative humidity gradually lowering from about 18 per cent.

5. The combination of a drying chamber through which the material passes, means for supplying to one portion of the chamber fresh air and return air from the chamber, means for regulating the proportions of the fresh and return air supplied to the chamber to control the humidity in said portion of the chamber, means for regulating the temperature in said portion of the chamber, air recirculating means for withdrawing air from the chamber and returning it to a second portion of the chamber, means for regulating said recirculation of the air to control the humidity in said second portion of the chamber, and means for controlling the temperature in said second portion of the chamber.

6. The hereindescribed method of drying material, such as sliced fruits and vegetables, which is subject to oxidation from exposure, consisting in passing the material downwardly through a drying chamber, withdrawing air from and returning it to the upper portion of the chamber, controlling the temperature in the upper portion of the chamber and the recirculation of air to the upper portion of the chamber to maintain a comparatively high temperature and relative humidity in the upper portion of the chamber, supplying fresh air and return air from the chamber to the lower portion of the chamber, and controlling the temperature in the lower portion of the chamber and the proportion of the fresh and return air supplied to the lower portion of the chamber to maintain a gradually lowering temperature and a gradually lowering humidity in the lower portion of the chamber.

7. The hereindescribed method of drying material, such as sliced fruits and vegetables, which is subject to oxidation from exposure, consisting in passing the material downwardly through a drying chamber, supplying heated air to the lower portion of the chamber, heating the ascending air in the drying chamber, controlling the temperature and humidity in the upper portion of the chamber to provide an upper drying zone having a comparatively high temperature and relative humidity, separately regulating the temperature and humidity in the lower portion of the chamber to provide a lower drying zone having a gradually lowering temperature and a gradually lowering relative humidity.

8. The combination of a drying chamber through which the material passes downwardly, means for supplying air to the lower portion of the chamber, means for regulating the temperature in the lower portion of the chamber, means for withdrawing air from the upper and lower portions of the chamber and returning it to the upper portion of the chamber, means for regulating the proportion of air from the lower and upper portions of the chamber returned to said upper portion of the chamber, and means for regulating the temperature in the upper portion of the chamber.

9. The combination of a drying chamber through which the material passes downwardly, air supply means for the lower portion of the chamber having an inlet for fresh air and an inlet for return air from the chamber, a hygrostat regulating the proportion of fresh and return air supplied to the chamber for controlling the humidity in the lower portion of the chamber, means for regulating the temperature in the lower portion of the chamber, air recirculating means having connections for withdrawing air from and returning it to the upper portion of the chamber, a hygrostat regulating said recirculation of air for controlling the humidity in the upper portion of the chamber, and means for regulating the temperature in the upper portion of the chamber.

10. The combination of a drying chamber through which the material passes downwardly, a fan for supplying air to the lower portion of said chamber, said fan having inlets for fresh air and for return air from the chamber, means for heating the entering air, a hygrostat controlling the proportion of fresh and return air entering the chamber, a thermostat controlling the temperature of the air entering the chamber, an air recirculating fan having inlets connecting with the chamber at different elevations and a discharge connecting with the upper portion of the chamber, a hygrostat controlling the proportion of recirculating air from different portions of the chamber, thermostatically controlling means for heating said recirculating air, and thermostatically controlled air heating means in the chamber.

Witness my hand this 2nd day of December, 1918.

BURT S. HARRISON.

Witnesses:
    IRENE SPIELBERGER,
    CATHERINE CONCANNON.